United States Patent [19]

Murakami et al.

[11] Patent Number: 4,634,973
[45] Date of Patent: Jan. 6, 1987

[54] POSITION DETECTING APPARATUS

[75] Inventors: Azuma Murakami, Tokyo; Yoshinori Taguchi, Ageo, both of Japan

[73] Assignee: Wacom Co., Ltd., Saitama, Japan

[21] Appl. No.: 625,281

[22] Filed: Jun. 27, 1984

[30] Foreign Application Priority Data

Jun. 29, 1983 [JP] Japan ................... 58-117968
Jun. 29, 1983 [JP] Japan ................... 58-117969

[51] Int. Cl.$^4$ .............................................. G01B 7/14
[52] U.S. Cl. ................................. 324/207; 178/18
[58] Field of Search ....................... 324/207, 208;
246/122 R; 382/64; 367/117, 127, 118;
336/110, 20; 318/118; 310/26; 178/18

[56] References Cited

U.S. PATENT DOCUMENTS 4,071,818 1/1978 Krisst ........................... 324/208
4,412,454 10/1983 Yamashita et al. ............ 336/20 X Primary Examiner—Reinhard J. Eisenzopf
Assistant Examiner—Robert W. Mueller
Attorney, Agent, or Firm—Pollock, VandeSande & Priddy

[57] ABSTRACT

A position detecting apparatus for detecting a position appointed by a position appointing magnetism generator 7. The apparatus has at least one magnetostrictive transmission medium 1 and a first coil 2 and a second coil 5 around the medium 1 in such a manner that signals are exchanged between these coils 2,5 through the intermediary of the magnetostrictive transmission medium 1. The electro-magnetic coupling coefficient of the magnetostrictive transmission medium 1 is locally changed at a selected position by the position appointing magnetism generator 7, and this position is detected through the detection of timing of change in the signal level attributable to the change of the above-mentioned coefficient. The magnetism generator 7 need not be connected to any portion of the apparatus, and yet the appointed position can be detected at a high resolution even if the position appointing magnetism generator 7 is vertically spaced considerably from the position detection range. This apparatus can be used, for example, in the detection of position of a moving object, by attaching the position appointing magnetism generator to the moving body while laying the magnetostrictive transmission medium along the path of movement of the moving body.

6 Claims, 15 Drawing Figures (a)                    (b)

POSITION DETECTING APPARATUS

BACKGROUND OF THE INVENTION

1. Field of the Invention

The present invention relates to an apparatus for detecting a position appointed by a position appointing magnetism generator. More particularly, the invention is concerned with a position detecting apparatus of the type mentioned above, capable of detecting the appointed position by making use of a magnetostrictive vibration wave which is propagated through a magnetostrictive transmission medium, without requiring any exchange of timing signal between the apparatus and the magnetism generator.

2. Description of the Prior Art

A typical example of the position detecting apparatus of the kind described is shown in, for example, Japanese Patent Publication No. 32668/1981. In this known apparatus, an instantaneous change of magnetic field is generated by a position appointing magnetism generator and is propagated in the form of magnetostrictive vibration wave through a magnetostrictive transmission medium to reach a detecting coil disposed at the distal end of the medium. The position appointed by the position appointing magnetism generator is detected by measuring and processing with a processing unit the length of time from the moment at which the instantaneous change in magnetic field is generated until the moment at which the magnetostrictive vibration wave is detected by the detecting coil. In this known apparatus, therefore, it is necessary to connect the position appointing magnetism generator to the processing unit through a signal line, in order to inform the processing unit of the timing at which the instantaneous change in the magnetic field is generated. Consequently, the mobility, as well as the handling, of the position appointing magnetism generator is restricted undesirably. For this reason, the known position detecting apparatus has been able to find only limited use.

SUMMARY OF THE INVENTION

Accordingly, it is a primary object of the invention to provide a position detecting apparatus, wherein first and second coils are wound around at least one magnetostrictive transmission medium so that signals are exchanged between these coils through the intermediary of the magnetostrictive transmission medium. With this arrangement, it becomes unnecessary to connect the position appointing magnetism generator to any fixed portion of the apparatus so that the position appointing magnetism generator can be moved freely without being limited by signal wire or other parts, so that the mobility and the handling of the apparatus are very much improved.

It is a second object of the invention to provide a position detecting apparatus which does not require the troublesome work of maintaining magnetism in the magnetostrictive transmission medium, e.g., periodical rubbing of the medium with a magnet bar, which is essential in the conventional coordinate position detecting apparatus of magnetorestriction type. This object can be accomplished by appointing a position through a local change of the electro-mechanical coupling coefficient of a magnetostrictive transmission medium effected by the position appointing magnetism generator.

It is a third object of the invention to provide a position detecting apparatus which can detect the appointed position at a high resolution even when the position appointing generator is held above the transmission medium surface by a substantial distance of several centimeters or greater. To this end, the invention proposes to make use of the fact that the electro-mechanical coupling coefficient of the magnetostrictive transmission medium is saturated at a level of several Oe (oersted).

It is a fourth object of the invention to provide a position detecting apparatus which can cover a wide area for detection of position. To this end, the invention provides a position detecting apparatus having first and second coils wound around a plurality of magnetostrictive transmission medium elements arranged substantially parallel with one another, such that signals are exchanged between two coils through the intermediary of the magnetostrictive transmission medium elements.

It is a fifth object of the invention to provide a position detecting apparatus having an enlarged position detection region. To achieve such an enlarged position detection region, the invention proposes a position detecting apparatus comprising: a plurality of magnetostrictive wire bundles arranged substantially in parallel with one another and each having at least one magnetostrictive transmission medium element; a first coil wound around all the magnetostrictive wire bundles at one of the ends thereof; a second coil composed of a plurality of second coil elements wound around respective magnetostrictive wire bundles over a considerable length thereof, the second coil elements being wound in the same direction and connected in series; a pulse current adapted to apply a pulse current to either the second coil or the first coil so as to produce a magnetostrictive vibration wave in each of the magnetostrictive transmission medium elements simultaneously; a processing unit adapted to detect the time length between the moment at which the magnetostrictive vibration wave is produced and the moment at which a voltage is induced in the other of the coils by the magnetostrictive vibration wave; a plurality of biasing magnetic bodies adapted to apply biasing magnetic fields to the portions of the magnetostrictive wire bundles around which the first coil is wound; and a position appointing magnetism generator which is not connected to any part of the apparatus; wherein the second coil elements which are wound around about a half of the magnetostrictive wire bundles have a connection polarity reverse to that of the second coil elements wound around the other half of the magnetostrictive wire bundles, and wherein the biasing magnetic body applying biasing magnetic fields to the first-mentioned half of the magnetostrictive wire bundles has a polarity opposite that of the biasing magnetic bodies which applies the biasing magnetic fields to the other half of the magnetostrictive wire bundles.

With this arrangement, the voltage induced as a result of electromagnetic induction between the first coil and the second coil is decreased to a negligibly small level, so that the distance between the first coil and the second coil can be reduced sufficiently to permit an increase in the range of position detection.

The above and other objects, features and advantages of the invention will become clear from the following description of the preferred embodiments when the same is read in conjunction with the accompanying drawings.

DESCRIPTION OF THE PREFERRED EMBODIMENTS

Figure 1:
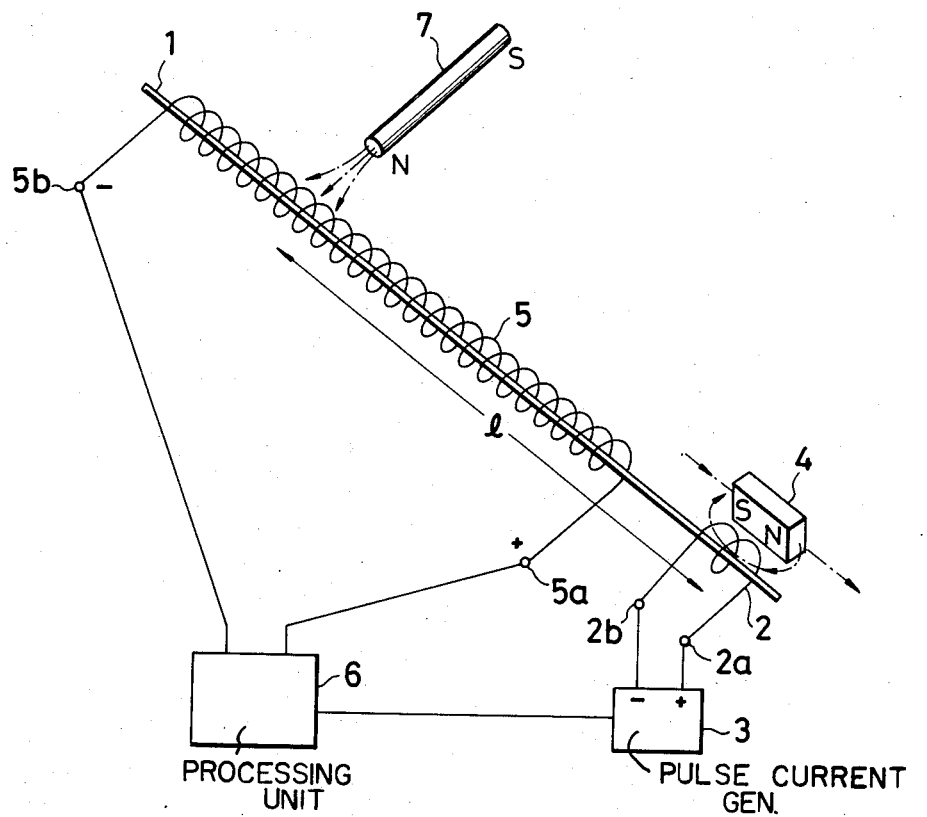
FIG. 1 is an illustration of an embodiment of the invention.

Before turning to the description of the preferred embodiments, the principle of the invention will be explained to facilitate understanding of the invention.

When the magnetostrictive vibration wave is propagated through a magnetostrictive transmission medium, a part of the mechanical vibration energy is changed into magnetic energy such as to produce a local change in the magnetic field at the position where the magnetostrictive vibration wave exists. The magnitude of the change in the magnetic field is proportional to a coefficient (referred to as "electro-mechanical coupling coefficient) which represents the coefficient of conversion from mechanical energy into magnetic energy. The electro-magnetic coefficient takes its maximum value at a certain level of intensity of the biasing magnetic field.

It is assumed here that a magnetostrictive transmission medium is surrounded by a coil, over its entire length and that a magnetic bias of a level which causes a local increase of the electro-mechanical coupling coefficient is applied by a position appointing magnetism generator only to a preselected portion of the medium. In such an arrangement, a large change in the magnetic field is caused when the wave of magnetostrictive vibration has reached the portion under the magnetic bias, so that a large electromotive force is induced in the coil by the magnetostrictive vibration. By detecting the timing of generation of this large electromotive force, it is possible to know the length of time which it will take for the magnetostrictive vibration wave to reach the position appointed by the position appointing magnetism generator. The appointed position is identified by processing this time length.

The electro-mechanical coupling coefficient also determines the magnitude of the magnetostrictive vibration wave generated in the magnetostrictive transmission medium by the instantaneous change in the magnetic field intensity. Namely, the greater the coupling coefficient is, the larger the magnitude of the magnetostrictive vibration becomes. Therefore, if a magnetic bias of a level which causes an increase in the electromechanical coupling coefficient is applied by the position appointing magnetism generator to a magnetostrictive transmission medium surrounded by a coil over its entire length, a large magnetostrictive vibration is caused locally only at the appointed position, when a pulse voltage is applied to the coil. Assuming here that another coil is provided at the distal end of the magnetostrictive transmission medium, a large electromotive force is produced in this coil when it is reached by the large magnetostrictive vibration wave. By detecting the timing of generation of the electromotive force, it is possible to detect the appointed position for the same reason as that explained above.

The apparatus of the invention is able to detect the position appointed by the position appointing magnetism generator by making effective use of the theory described hereinabove, as will be understood from the following description of the preferred embodiments.

Referring first to FIG. 1 schematically showing the construction of an embodiment of the invention, a magnetostrictive transmission medium is made from a material having a magnetostrictive effect. Although any type of ferromagnetic material can be used as the material of this medium, materials having large magnetostrictive effect such as amorphous alloys rich in Fe are preferably used in order to produce a strong magnetostrictive vibration wave. It is also preferred that the material of the magnetostrictive transmission medium has a small coercive force so that the medium will not be magnetized easily due to accidentally caused influence from a magnet. Examples of amorphous alloys which can be preferably used are $Fe_{67}Co_{14}Si_1$ (atomic %) and $Fe_{81}B_{13.5}Si_{13.5}C_2$ (atomic %). The magnetostrictive transmission medium 1 can have an elongated web-like form having a thin rectangular cross-section or an elongated linear form with a circular cross-section. When the magnetostrictive transmission medium 1 has a web-like form, the thickness of this medium preferably ranges between several $\mu m$ and several tens of $\mu m$, while the width is selected preferably on the order of several millimeters. As is well known, amorphous alloys can be produced rather easily in the form of a thin ribbon of a thickness on the order of 20 to 50 $\mu m$. The magnetostrictive transmission medium in the thin web-like form with a rectangular cross-section or in a linear form with a cylindrical cross-section can be obtained by suitably cutting the ribbon of the amorphous alloy.

The illustrated embodiment employs a magnetostrictive transmission medium of 2 mm wide and 0.02 mm thick, made of $Fe_{81}B_{13.5}Si_{13.5}C_2$ (atomic %).

A reference numeral 2 denotes a first coil which is wound around an end of the magnetostrictive transmission medium 1. Although the number of turns of the coil 2 is 2 (two) in the illustrated embodiment, the number may be 3 (three) or greater. The first coil has the function of producing an instantaneous change in the magnetic field in the direction perpendicular to the plane of the coil thereby causing a magnetostrictive vibration wave in the portion of the magnetostrictive transmission medium surrounded by the coil 2. The coil 2 is connected at its one end 2a to the + (plus) terminal of a pulse current generator 3 which is capable of producing a pulse current strong enough to cause the magnetostrictive vibration wave, while the other end 2b of the same is connected to the minus (−) terminal thereof.

Figure 2:
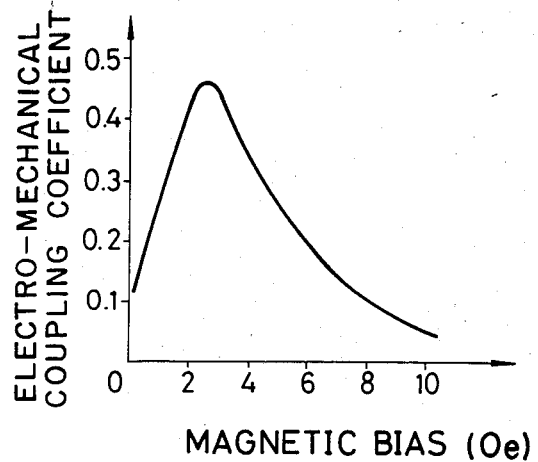
FIG. 2 is a graph showing how the electro-magnetic coupling coefficient is changed in relation to the magnetic bias.

A biasing magnetic body 4 is adapted to apply a biasing magnetic field in the direction parallel to the longitudinal axis of the magnetostrictive transmission medium 1 to the portion of the latter around which the first coil 2 is wound. This biasing magnetic field is applied for the purpose of enabling generation of a magnetostrictive vibration wave with a comparatively small electric current. Since the electro-mechanical coupling coefficient is maximized at a certain level of the biasing magnetic field as shown in FIG. 2, the efficiency of generation of the magnetostrictive vibration wave can be increased by applying a biasing magnetic field of such a level. The biasing magnetic body 4 may be omitted if a small amount of electric power consumption is permissible. The biasing magnetic body 4, which in this case has the form of a bar magnet, may be substituted by ring-shaped magnet or even by a solenoid.

Referring again to FIG. 1, a second coil 5 is wound around the magnetostrictive transmission medium 1. This coil 5 has the function of detecting the voltage produced by the magnetostrictive vibration wave propagated through the magnetostrictive transmission medium 1. This second coil 5, therefore, is wound over a considerable length of the magnetostrictive transmission medium. The length or range of the medium covered by the second coil 5 is the range within which the appointed position is detectable. In order to obtain a greater electromotive force, the second coil 5 preferably has a large coil pitch. For instance, this embodiment has a pitch of 7 turns/cm. The second coil 5 has two terminals 5a,5b which are connected to input terminals of a processing unit 6. In the illustrated embodiment, the position appointing magnetism generator is constituted by a cylindrical bar magnet 7 having a diameter of 3 mm and a length of 50 mm. Thus, the embodiment under description detects the position which is appointed by the bar magnet 7.

It is assumed here that both the first and second coils 2 and 5 are wound counterclockwise, and that the biasing bar magnet 4, the pulse current applied to the first coil 2 and the electromotive force induced in the second coil 5 have polarities as shown in the drawings. It is assumed further that the position appointing bar magnet 7 is positioned at a distance 1 from the center of the plane of the second coil 2, with its N-pole directed downwardly, so as to apply to the opposing portion of the magnetostrictive transmission medium 1 a magnetism of a level which can increase the electro-mechanical coupling coefficient.

In this state, as the pulse current from the pulse current generator 3 is applied to the first coil 2, the first coil 2 generates an instantaneous change of magnetic field which in turn produces a magnetostrictive vibration wave in the portion of the magnetostrictive medium 1 around which the coil 2 is wound. This magnetostrictive vibration wave is propagated through the magnetostrictive transmission medium 1 along the length of the latter at a propagation speed (about 5,000 m/sec) peculiar to the magnetostrictive transmission medium 1. During the propagation of the magnetostrictive vibration wave, a conversion from mechanical energy into magnetic energy is effected at every moment in the portion of the magnetostrictive transmission medium 1 where the magnetostrictive vibration wave exists, so that an electromotive force is generated in the second coil 5.

Figure 3:
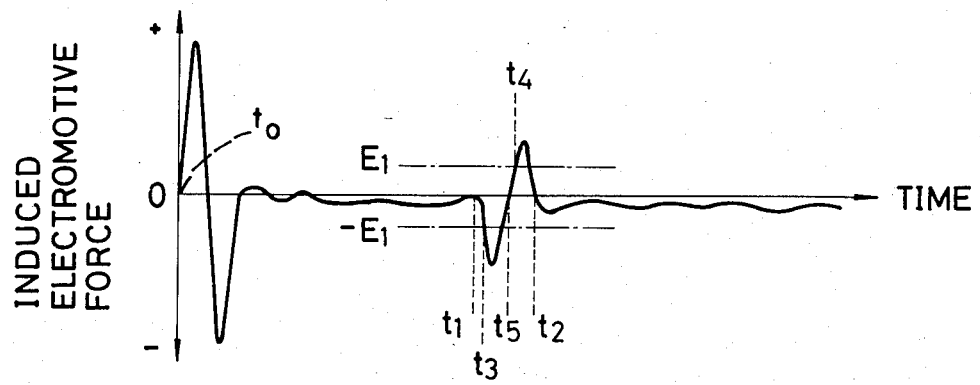
FIG. 3 is a diagram showing how the electromotive force induced in a coil 5 shown in FIG. 2 is changed in relation to time.

FIG. 3 shows an example of the change of electromotive force generated in the second coil 5 in relation to time. In this Figure, $t_0$ represents the moment at which the pulse current is applied to the first coil 2. As will be seen from this Figure, the amplitude of the electromotive force induced in the second coil 5 shows peaks during a short period immediately after the moment $t_0$ and a short period which is $t_1$ to $t_2$ seconds after the moment $t_0$, but is small in other periods. The peak of the amplitude of electromotive force appearing immediately after the moment $t_0$ is attributable to the electromagnetic induction between the first coil 2 and the second coil 5, while the peak observed in the period between the moments $t_1$ and $t_2$ is caused by an increase in the electro-mechanical coupling coefficient in the position just beneath the position appointing bar magnet 7, as a result of the arrival of the magnetostrictive vibration wave at this position. It will be seen that the movement of the position appointing bar magnet 7 along the length of the magnetostrictive bar magnet 7 causes a movement of the second peak of the induced voltage along the time axis in FIG. 3. It is, therefore, possible to detect the position appointed by the position appointing bar magnet 7, i.e., the distance l, by measuring the time length between the moment $t_0$ and the moments $t_1$-$t_2$. The propagation time as the index of the position may be measured by detecting, for example, the moment $t_3$ at which the amplitude of the voltage induced by the magnetostrictive vibration has come down below a threshold value $-E_1$ or a moment $t_4$ at which the amplitude has come to exceed another threshold voltage $E_1$. It is also possible to use the moment $t_5$ of the zero-cross point as the index of the propagation time. It is, however, to be noted that the induced voltage usually has a greater amplitude in its earlier half cycle than in the later half cycle thereof. From this point of view, it is preferred to use the moment $t_3$ or the moment $t_5$.

It has been confirmed through experiments that, in the arrangement shown in FIG. 1, the polarity of the voltage induced by the magnetostrictive vibration wave is reversed by reversing the polarity of the position appointing bar magnet 7 or of the biasing bar magnet 4, reversing the winding direction of the first coil 2 or the second coil 5, or reversing the polarity of connection of the first coil 2 or the second coil 5. The peak of the voltage induced immediately after the moment $t_0$ has an undesirable waveform. In order to sufficiently reduce this peak voltage, it is preferable to increase the distance between the first coil 2 and the second coil 5 or, alternatively, to provide a magnetic shield between these coils.

Figure 4:
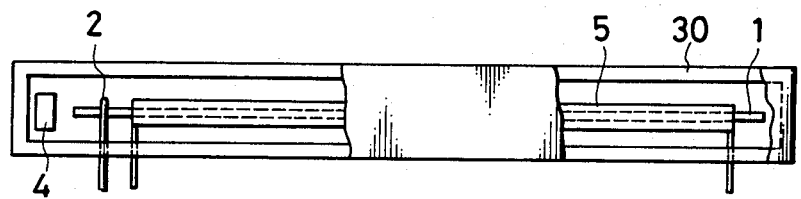
FIG. 4 is a partly cut-away plan view of an example of the detecting section of a position detecting apparatus.
Figure 5:
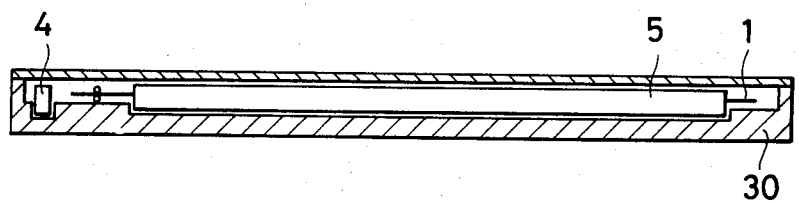
FIG. 5 is a sectional view of the detecting section taken along the longitudinal axis thereof.

FIG. 4 is a partly cut-away plan view of an example of the detecting section of the position detecting apparatus of the invention, while FIG. 5 is a sectional view taken along the longitudinal axis thereof. As will be seen from these Figures, the second coil 5 receiving the magnetostrictive transmission medium 1 is placed in a recess formed in the inner bottom surface of a housing 30 and is fixed as desired by an adhesive. Since the apparatus of the invention makes use of the propagation of magnetostrictive vibration waves in the longitudinal vibration mode, it is preferred that the degree of freedom of movement of the magnetostrictive transmission medium 1 is not limited. The ends of the second coil 5 and the first coil 2 are led to the outside of the housing 30 from the lateral side of the latter and are connected, respectively, to the pulse current generator 3 and the processing unit 6 shown in FIG. 1, as described before. The biasing magnetic body 4 is fixed in the recess formed in the inner bottom surface of the housing 30 such as to oppose the end of the magnetostrictive transmission medium 1, although it may be disposed above, below or at a lateral side of the magnetostrictive transmission medium 1 in parallel with the latter, as shown in FIG. 1. The housing 30 is covered by a lid 31 on which the position appointing bar magnet 7 moves.

Figure 6:
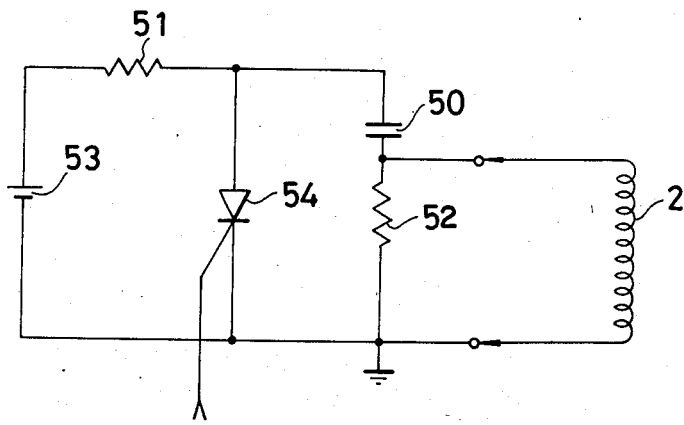
FIG. 6 is an electric circuit diagram of an example of a pulse current generator 3.

FIG. 6 is an electric circuit diagram of an example of the pulse current generator 3. The pulse current generator 3 has a capacitor 50 which is adapted to be charged by a D.C. source 53 through resistors 51 and 52. A thyristor 54 is connected in parallel to the series connection of the capacitor 50 and the resistor 52. In operation, as the thyristor 54 is turned on, the capacitor 50 discharges through the thyristor 54 and the resistor 52 so that the voltage produced between both terminals of the resistor 52 is applied to the first coil 2. The thyristor 54 is adapted to be turned on when its gate receives a trigger pulse coming from the processing unit 6.

Figure 7:
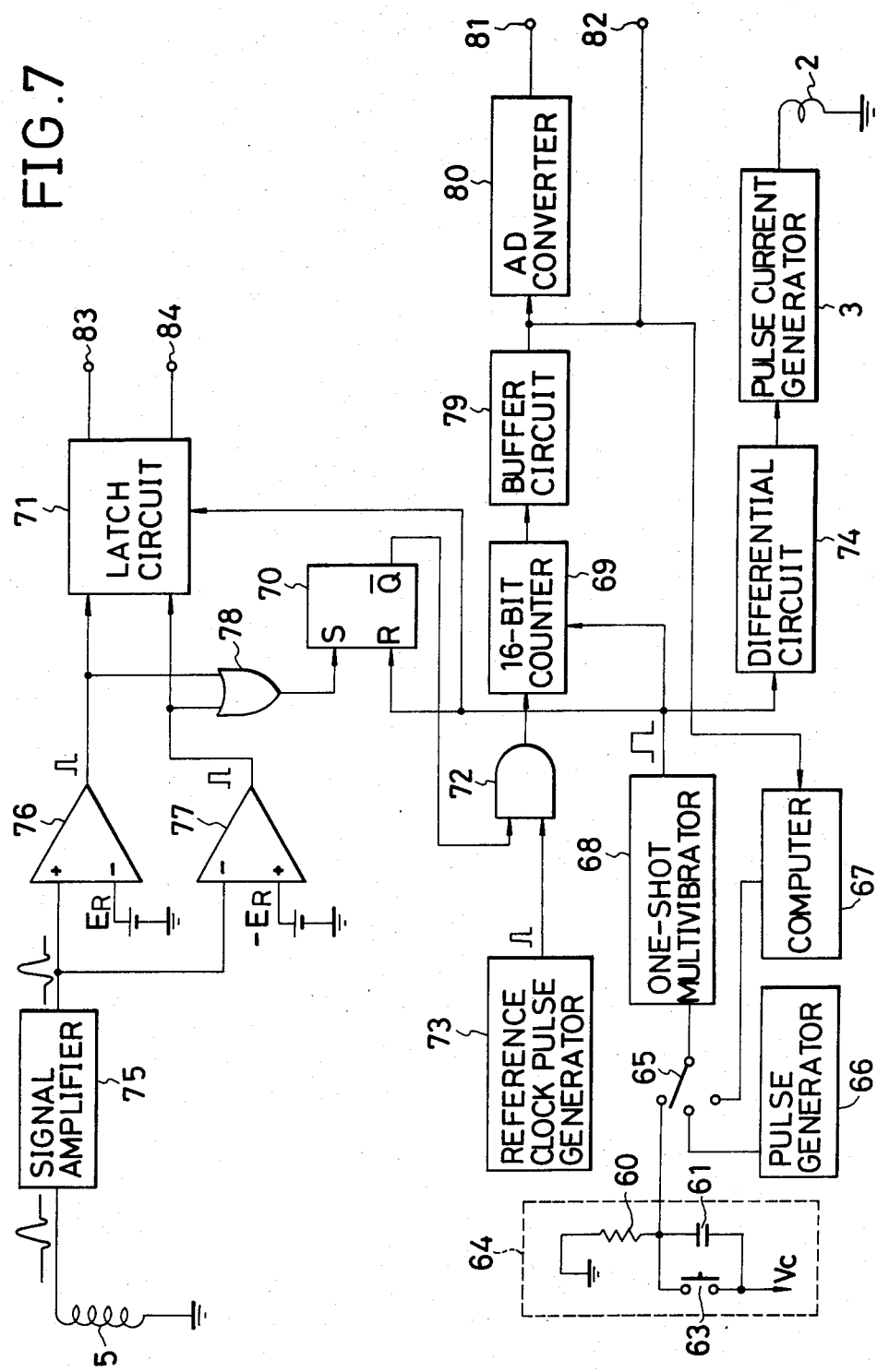
FIG. 7 is a block diagram of an essential part of an example of a processing unit 6.

FIG. 7 shows a block diagram of an essential part of an example of the processing unit 6. A manual pulse generator 64 is constituted by a resistor 60 and a capacitor 61 which are connected in series between a voltage source Vc and the earth, and a switch 63 connected in parallel to the capacitor 61. The pulse output is taken out from the terminals of the capacitor 61 and is inputted to a change-over switch 65. A measuring instruction pulse is supplied by either the manual pulse generator 64, a pulse generator 66 adapted to produce pulses at a predetermined period, on a computer 67 by the proper positioning of the change-over switch 65. The instruction pulse output is then sent through the change-over switch 65 to the one-shot multivibrator 68. A pulse is produced by the one-shot multivibrator 68 in response to the rise of the measuring instant pulses. The pulse produced has a duration or pulse width of about 15 μsec, so as to clear a 16-bit counter 69, while resetting an RS flip-flop 70 and a latch circuit 71 are simultaneously reset. The $\overline{Q}$ output from the RS flip-flop 70 is delivered as a gate signal to an AND circuit 72 so that the 16-bit counter 69 starts to count the output pulses from a clock generator 73 (pulse frequency 100 MHz, for example), when the RS flip-flop is reset. On the other hand, the output from the one-shot multivibrator 68 is received also by a differentiation circuit 74 which is adapted to output only the plus (+) component of the differentiated waveform. The differentiation circuit 74 produces a trigger pulse to a pulse current generator 3, so that a pulse current is applied to the first coil 2.

The electromotive force induced in the second coil 5 can be amplified by a signal amplifier 75 and is delivered to the plus (+) input terminal of the comparator 76 and the minus (−) terminal of the comparator 77. The minus (−) input terminal of the comparator 76 receives, for example, a voltage Er corresponding to the threshold value E1 shown in FIG. 3. Therefore, when the output of the signal amplifier 75 exceeds the threshold value Er, i.e., when the positive portion of the voltage induced by the magnetostrictive vibration wave is detected, the comparator 76 produces an output of high level. Meanwhile, the plus (+) terminal of the comparator 77 receives a voltage −Er corresponding to the threshold value −E1 shown in FIG. 2. The comparator 77 produces an output of high level when the output from the signal amplifier 75 comes down below the voltage −Er, i.e., when the positive portion of the voltage induced by the magnetostrictive vibration wave is detected. It is possible to know which one of the N and S poles of the position appointing bar magnet is opposed to the magnetostrictive transmission medium 1, from information as to which one of the positive and negative values has exceeded the threshold value which is provided by the comparison made by the comparators 76 and 77, or the information concerning which one of the comparators operated first. This information is latched by the latch circuit 71 and is outputted as the polarity of the detected magnetic body, through output terminals 83 and 84. If the detection of accessing polarity is not necessary, it is possible to omit the latch circuit 71 and either of the comparators 76 and 77.

The output from the comparator 76 or 77 resets the RS flip-flop 70 through the OR circuit 78, so that the RS flip-flop 70 produces the $\overline{Q}$ output to close the AND circuit 72. Consequently, the 16-bit counter stops operating. Thus, the 16-bit counter 69 stops the counting operation when voltage is induced in the second coil 5 by the magnetostrictive vibration wave. It is, therefore, possible to obtain a digital signal which represents the time length between the moment at which the measuring instruction is issued and the moment at which the voltage is induced. Since the magnetostrictive vibration wave is propagated at a substantially constant velocity of about 5,000 m/sec, the measured time length directly indicates the distance between the first coil 2 and the position of the position appointing bar magnet 7. The thus obtained digital data concerning the position is inputted to an analog-to-digital converter 80 through a buffer circuit 79, and is taken out in the form of an analog signal from the output terminal 81. Alternatively, the data is derived in the form of the digital signal from the terminal 81 or inputted to the computer 67 so as to be processed by the latter.

Figure 8:
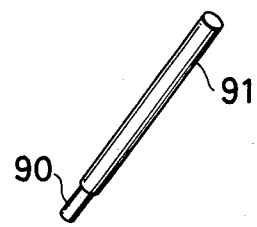
FIG. 8 is a perspective view of an example of a position appointing magnetism generator.

FIG. 8 is a perspective view showing another example of the position appointing magnetism generator. This generator has a cylindrical magnetic body 90 attached to one end of a pen-shaped elongated vessel 91. The cylindrical magnetic body 90 may have comparatively small or large axial length.

Figure 9:
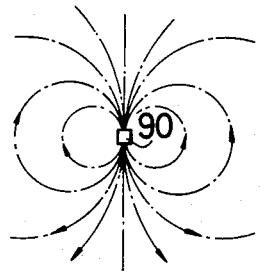
FIG. 9 is an illustration showing the distribution of magnetic lines of force on a cylindrical magnetic member 90.
Figure 9:
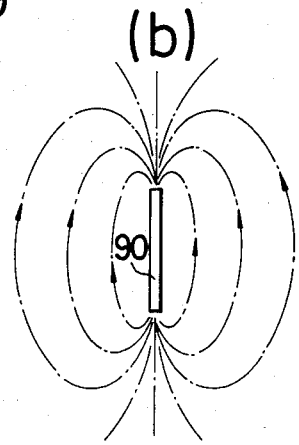

FIG. 9(a) shows the distribution of magnetic lines of force on a short cylindrical magnetic body, while FIG. 9(b) shows the same on a long cylindrical magnetic body.

Figure 10:
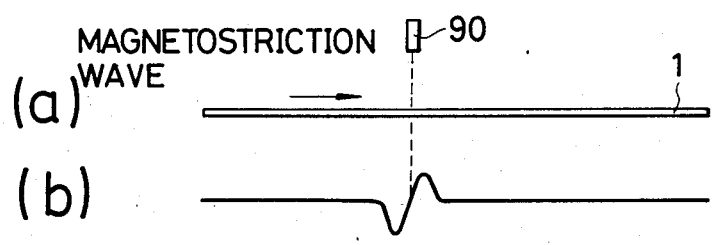
FIG. 10 is an illustration of the relationship between the magnetostrictive vibration wave and the position appointing magnetism generator.

FIG. 10 shows the cylindrical magnetic body 90 disposed at a right angle to the magnetostrictive transmission medium 1 so that the polarity of the magnetic field parallel to the magnetostrictive medium 1 resulting from the movement of the magnetostrictive vibration wave toward and away from the cylindrical magnetic body 90 is opposite that obtained when the vibration wave moves away from the same. In consequence, the polarity of the voltage induced by the magnetostrictive vibration is reversed when the vibration wave passes the position just under the cylindrical magnetic body 90 as shown in FIG. 9(b).

Figure 11:
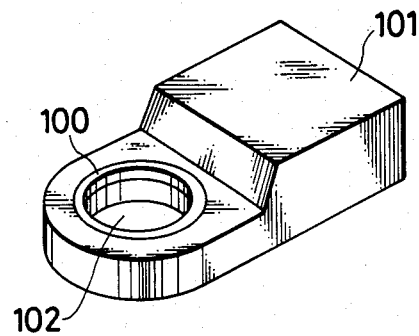
FIG. 11 is a perspective view of another example of the position appointing magnetism generator.

FIG. 11 is a perspective view of still another example of the position appointing magnetism generator. This generator has a ring-shaped magnetic body 100 horizontally and fixedly accommodated in a through bore 102 formed in a cursor 101 having a flat bottom. The ring-shaped magnetic body 100 exhibits a distribution of magnetic lines of force substantially equivalent to those of a cylindrical magnetic body positioned on the central axis of the ring-shaped magnetic body and, therefore, can be used as the position appointing magnetism generator. The ring-shaped magnetic body 100 may be magnetized either vertically or horizontally. The ring-shaped magnetic body 100 which is magnetized horizontally can be suitably used in close proximity to the magnetostrictive transmission medium 1, while the vertically magnetized ring-shaped magnetic body is suitable for use at a position comparatively remote from the medium 1.

Figure 12:
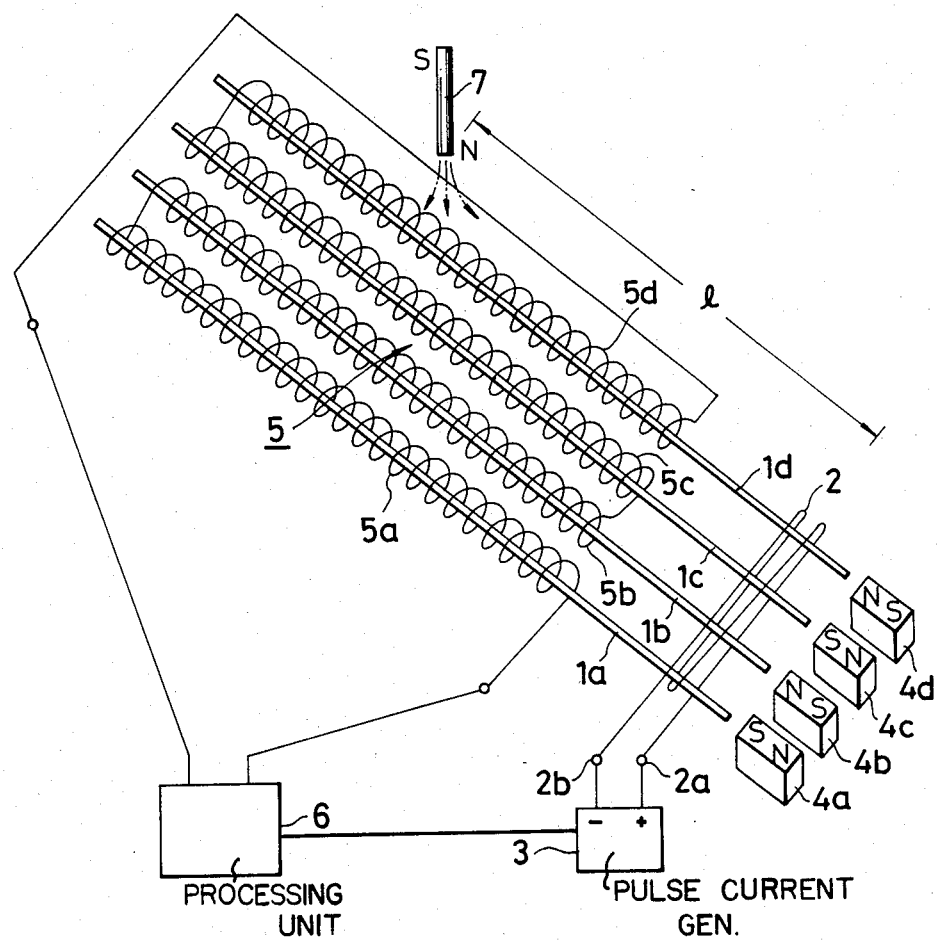
FIG. 12 is an illustration of another embodiment.

FIG. 12 shows another embodiment of the position detecting apparatus in accordance with the invention. This embodiment employs a plurality of magnetostrictive transmission medium elements 1a to 1d having a magnetostrictive effect and arranged in parallel with one another. Each of the magnetostrictive transmission medium elements 1a to 1d has a construction identical to that of the preceding embodiment.

A reference numeral 2 denotes a first coil which is wound around an end of the magnetostrictive transmission medium elements 1a to 1d. Although the number of turns of the coil 2 is 2 (two) in the illustrated embodiment, the number may be 3 (three) or greater. The first coil 2 is for producing an instantaneous change in the magnetic field in the direction perpendicular to the plane of the coil thereby causing a magnetostrictive vibration wave in the portion of the magnetostrictive transmission medium elements 1a to 1d surrounded by the coil 2. The coil 2 is connected at its one end 2a to the + (plus) terminal of a pulse current generator 3 capable of producing a pulse current strong enough to cause the magnetostrictive vibration wave, while the other end 2b of the same is connected to the minus (−) terminal thereof.

Biasing magnetic bodies 4a to 4d are adapted to apply a biasing magnetic field in the direction parallel to the longitudinal axis of the magnetostrictive transmission medium elements 1a to 1d to the portion of the latter around which the first coil 2 is wound. This biasing magnetic field is applied for the purpose of enabling generation of a magnetostrictive vibration wave with a comparatively small electric current. Since the electro-mechanical coupling coefficient of the magnetostrictive transmission medium elements 1a to 1d is maximized at a certain level of the biasing magnetic field as shown in FIG. 2, the efficiency at which the magnetostrictive vibration wave generated can be increased by applying a biasing magnetic field of such a level. The biasing magnetic bodies 4a,4c have a polarity which is reverse to that of the biasing magnetic bodies 4b,4d, for a reason which will be detailed later.

Referring again to FIG. 12, second coil elements 5a to 5d are wound around the magnetostrictive transmission medium elements 1a to 1d. The second coil elements 5a to 5d are intended to detect the voltage produced by the magnetostrictive vibration wave propagated through the magnetostrictive transmission medium 1. These second coil elements 5a to 5d, therefore, are wound over a considerable length of the magnetostrictive transmission medium elements. The length or range of the medium elements covered by the second coil elements 5a to 5d is the range within which the appointed position is detectable. In order to obtain a greater electromotive force, the second coil elements 5a to 5d preferably have a large coil pitch. For instance, in this embodiment, each of the second coil elements has a pitch of 7 turns/cm. All second coil elements 5a to 5d have an identical winding direction which is in this case counterclockwise. The coil elements 5a and 5b are connected to each other at the terminal ends of their the windings, while the starting ends of windings of the coil elements 5b and 5c are connected to each other. The coil elements 5c and 5d are connected to each other at the terminal ends of their windings. The starting ends of the windings of the coil elements 5a and 5d are connected to the input terminals of the processing unit 6. Thus, in the illustrated embodiment, the second coil elements 5a to 5d are connected in series, and adjacent coil elements have reverse polarities. The second coil elements 5a to 5d in combination constitute a second coil 5. The position appointing magnetism generator is constituted by a cylindrical bar magnet 7 having a diameter of 3 mm and a length of 50 mm. Other portions are materially identical to those of the preceding embodiments.

In this embodiment of the invention, it is possible to detect the longitudinal position on each magnetostrictive transmission medium element 1a to 1d appointed by the bar magnet 7, for the same reason as that explained in connection with the first embodiment. Besides this advantage, the following advantages are brought about by this embodiment. Referring to FIG. 12, when the position appointing bar magnet 7 is shifted laterally in the direction perpendicular to the direction in which the magnetostrictive transmission medium elements 1a to 1d are disposed until its N-pole is positioned above one of the other magnetostrictive position appointing medium elements 1b to 1d, the voltage is induced in the second coil in the same manner as that explained before in connection with FIG. 3. This is because the polarity of the biasing magnetic bodies 4a,4c is reverse to that of the biasing magnetic bodies 4b,4d while the polarity of the second coil elements 5a,5c is reverse to that of the second coil elements 5b,5d. Consequently, the polarity of the voltage induced by the magnetostrictive vibration wave is constant, so that it is possible to attain position detection with high precision. It is to be noted also that, in this embodiment, the peaks of voltage appearing in all the second coil elements are negated such as to become negligible, due to the direct induction by the second coil immediately after the moment t₀. This in turn permits the distance between the first coil 2 and the second coil 5 to be reduced so that the range of position detection can be advantageously increased. This effect is generally obtainable by making the second coil elements which cover about a half of the detection region have a polarity reverse to that of the second coil elements covering the other half of the same.

It has been confirmed through experiments that, in the arrangement shown in FIG. 12, when the position appointing bar magnet 7 is above the magnetostrictive transmission element 1a, the polarity of the voltage induced by the magnetostrictive vibration wave is reversed by reversing the illustrated polarity of the position appointing bar magnet 7 or of the biasing bar magnet 4a, reversing the winding direction of the first coil 2 or the second coil 5a, or reversing the polarity of connection of the first coil 2 or the second coil 5a.

Therefore, in the arrangement shown in FIG. 12, the voltage induced by the magnetostrictive vibration wave can have a constant polarity even when the winding direction of the second coil elements is changed from the illustrated direction, provided that the polarity of the biasing magnetic bodies 4b,4d is reversed. It is to be pointed out, however, that the level of the voltage induced directly in the second coil 5 by the first coil 2 will be increased unfavorably. The invention does not exclude such a modification that the second coil elements 5a to 5d are connected in parallel, although in such a modification the level of the voltage induced in the second coil 5 will be reduced. When the arrangement is such that the propagation time length is measured upon detection of the zero-cross point $t_5$ in FIG. 3, the precision of position detection is never affected even if the magnetostrictive transmission medium elements 1a to 1d have alternatingly changing polarities.

Figure 13:
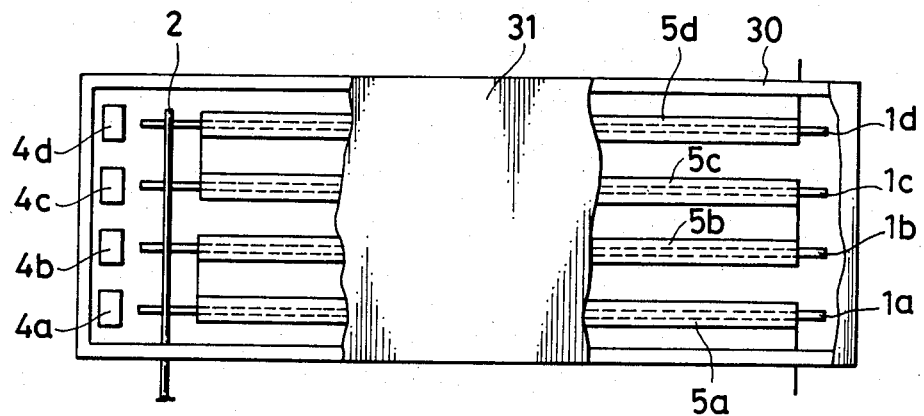
FIG. 13 is a partly cut-away plan view of another example of the detecting section of the position detecting apparatus.
Figure 14:
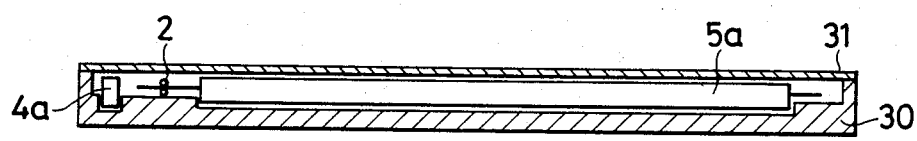
FIG. 14 is a sectional view of the detecting section shown in FIG. 13 taken along the longitudinal axis thereof.

FIG. 13 is a partly cut-away plan view of an example of the detecting section of the position detecting apparatus of the invention, while FIG. 14 is a sectional view taken along the longitudinal axis thereof. As will be seen from these Figures, the second coils 5a to 5d receiving the magnetostrictive transmission medium elements 1a to 1d are placed in a recess formed in the inner bottom surface of a housing 30 and are fixed as desired by an adhesive. Since the apparatus of the invention makes use of the propagation of magnetostrictive vibration waves in the longitudinal vibration mode, it is preferred that the freedom of movement of the magnetostrictive transmission medium elements 1a to 1d is not limited. The ends of the second coil 5 and the first coil 2 are led to the outside of the housing 30 from the lateral side of the latter and are connected, respectively, to the pulse current generator 3 and the processing unit 6 shown in FIG. 12 as described before. The biasing magnetic bodies 4a to 4d are fixed in the recess formed in the inner bottom surface of the housing 30 such as to oppose to the end of the magnetostrictive transmission medium elements 1a to 1d, although they may be disposed above, below or at a lateral side of the magnetostrictive transmission medium elements 1a to 1d in parallel with the latter, as shown in FIG. 1. The housing 30 is covered by a lid 31 on which the position appointing bar magnet 7 moves.

Figure 15:
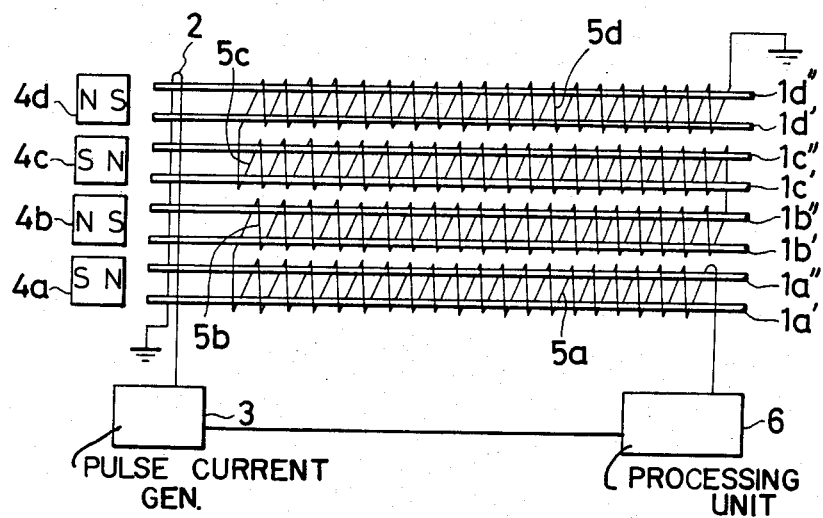
FIG. 15 is an illustration of still another embodiment of the invention.

FIG. 15 shows still another embodiment of the invention in which each of the coil elements 5a to 5d receives two parallel magnetostrictive transmission medium elements 1a' to 1d' and 1a" to 1d". Other portions are materially identical to those of the embodiment shown in FIG. 12. In this specification, each group of one or more magnetostrictive transmission medium elements received by one of the second coil elements 5a to 5d will be generally referred to as a "magnetostrictive wire bundle".

The embodiments explained in connection with FIGS. 12 and 15 employ a second coil 5 having a very large number of turns for the detection of the magnetostrictive vibration wave. Therefore, it is possible to have a very high level of electromotive force induced by the magnetostrictive vibration wave, which in turn permits a reduction of the pulse voltage to be applied to the first coil 2, thus contributing to a simplification of the circuit and saving of energy.

As explained before in connection with the principle of the invention, the invention does not exclude such a modification that the second coil 2 is connected to the pulse current generator 3 such as to be used as the source of the magnetostrictive vibration wave, while the first coil 2 is connected to the processing unit 6 such as to be used as the detector for detecting the magnetostrictive vibration wave.

As will be seen from the foregoing description, the position detecting apparatus of the invention can be used as an inputting apparatus for inputting a pattern or similar data to a computer, or an apparatus for detecting the position of a moving object. In the latter case, the position appointing magnetic body is attached to the moving body, while the magnetostrictive transmission medium is arranged along the path of movement of the moving body.

Although the invention has been described through specific terms, it is to be noted here that the described embodiments are not exclusive and various changes and modifications may be imparted thereto without departing from the scope of the invention which is limited solely by the appended claims.

What is claimed is:

1. A position detecting apparatus comprising:
   a plurality of magnetostrictive transmission medium elements arranged substantially in parallel with one another;
   a first coil wound commonly around one end of said magnetostrictive transmission medium elements;
   a second coil composed of a plurality of second coil elements wound around respective magnetostrictive transmission medium elements over a large length of said magnetostrictive transmission medium elements, said second coil elements being connected in series or in parallel;
   a pulse current generator for applying a pulse current to either one of said second coil and said first coil so as to produce magnetostrictive vibration waves in each of said magnetostrictive transmission medium elements simultaneously;
   a processing unit for detecting the time length between the moment at which said magnetostrictive vibration wave is produced and the moment at which a voltage is induced in the other of said second coil and said first coil by said magnetostrictive vibration wave; and
   a position appointing magnetism generator which is not connected to any part of the apparatus.

2. A position detecting apparatus according to claim 1, wherein said magnetostrictive transmission medium elements are made of an amorphous alloy.

3. A position detecting apparatus according to claim 1, further comprising a biasing magnetic body for applying a biasing magnetic field in a direction parallel to the longitudinal axis of said magnetostrictive transmission medium elements.

4. A position detecting apparatus comprising:
   a plurality of magnetostrictive wire bundles arranged substantially in parallel with one another and each having at least one magnetostrictive transmission medium element;
   a first coil wound commonly around one end of said magnetostrictive wire bundles;
   a second coil composed of a plurality of second coil elements wound around respective magnetostrictive wire bundles over a large length thereof, said second coil elements being wound in the same direction and connected in series;
   a pulse current generator for applying a pulse current to either one of said second coil and said first coil so as to produce a magnetostrictive vibration wave in each magnetostrictive transmission medium element simultaneously;
   a processing unit for detecting the time length between the moment at which said magnetostrictive vibration wave is produced and the moment at which a voltage is induced in the other of said second coil and said first coil by said magnetostrictive vibration wave;

a plurality of biasing magnetic bodies for applying biasing magnetic fields to the portions of said magnetostrictive wire bundles around which said first coil is wound; and a position appointing magnetism generator which is not connected to any part of the apparatus;

wherein the second coil elements wound around a half of said magnetostrictive wire bundles have a connection polarity opposite that of the second coil elements wound around the other half of said magnetostrictive wire bundles, and wherein said biasing magnetic bodies applying biasing magnetic fields to said half of said magnetostrictive wire bundles have a polarity opposite that of said biasing magnetic bodies which apply the biasing magnetic fields to the other half of said magnetostrictive wire bundles.

5. A position detecting apparatus according to claim 4, wherein said magnetostrictive transmission medium element is made of an amorphous alloy.

6. A position detecting apparatus according to claim 4, further comprising a biasing magnetic body for applying a biasing magnetic field in a direction parallel to the longitudinal axis of said magnetostrictive transmission medium element.

* * * * *